Figure 1:
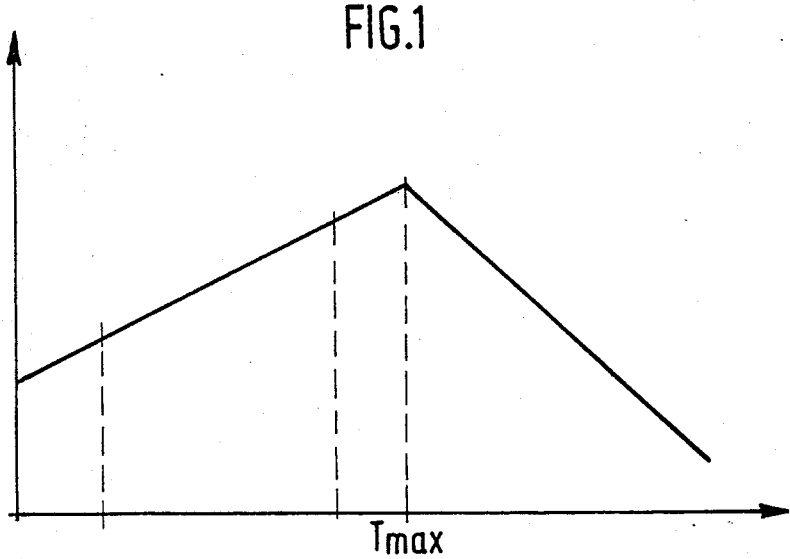

United States Patent [19]

Balat et al.

[11] Patent Number: 4,906,258

[45] Date of Patent: Mar. 6, 1990

[54] METHOD OF CONDUCTING AN ABSORPTION OR DESORPTION REACTION BETWEEN A GAS AND A SOLID

[75] Inventors: Marianne Balat, Saleilles; Alain Roca, Perpignan; Bernard Spinner, Corneilla del Vercol, all of France

[73] Assignee: Societe Nationale Elf Aquitaine, Courbevoie, France

[21] Appl. No.: 239,926

[22] Filed: Sep. 2, 1988

[30] Foreign Application Priority Data

Sep. 7, 1987 [FR] France ................................ 87 12389

[51] Int. Cl.$^4$ .............................................. B01D 53/04
[52] U.S. Cl. ......................................... 55/74; 564/463
[58] Field of Search ........................... 55/74, 387, 388; 62/480; 564/463

[56] References Cited

U.S. PATENT DOCUMENTS

| | | | |
|---|---|---|---|
| 1,950,502 | 3/1934 | Madan | 55/388 |
| 2,196,021 | 4/1940 | Merrill | 55/388 |
| 2,379,142 | 6/1945 | Gaugler et al. | 55/388 X |
| 3,549,560 | 12/1970 | Monsimer | 564/463 X |
| 4,111,991 | 9/1978 | Garrison | 564/463 X |
| 4,595,774 | 6/1986 | Coste et al. | 556/118 |

FOREIGN PATENT DOCUMENTS 2546278 11/1984 France .
2593588 7/1987 France .

OTHER PUBLICATIONS

S. Mauran et al., *Revue Phys. App.,* vol. 18, No. 2, pp. 107–112 (1983).

*Primary Examiner*—Robert Spitzer
*Attorney, Agent, or Firm*—Oblon, Spivak, McClelland, Maier & Neustadt

[57] ABSTRACT

Method of conducting an absorption or desorption reaction between a gas and a solid in which the reaction medium is formed using a powdery solid having a compaction between 5 and 60% of the optimum compaction of the reaction without graphite.

7 Claims, 1 Drawing Sheet

METHOD OF CONDUCTING AN ABSORPTION OR DESORPTION REACTION BETWEEN A GAS AND A SOLID

The present invention relates to a method of conducting an absorption or desorption reaction between a gas and a solid, this solid being formed by a salt or a mixture of salts capable of reacting with the gas while giving an absorption reaction or conversely a desorption reaction, these reactions taking place in the presence of expanded graphite. The principle of these reactions between a gas and a solid is described for example in the French Pat. No. 2 547 512: "Method of implementing a gas-solid reaction" or else in the French Pat. No. 2 548 340: "Three phase heat pump" or else in the French patent application No. 85 08408 filed on June 4, 1985: "Thermochemical heat storage and destorage method and device".

Furthermore, the absorption or desorption reaction kinetics have been studied as a function of the initial condition of the salts. In particular, the article published in the review Physique Appliquée 18 (1983) pages 107 to 112 of February 1983 entitled: "Optimisation des densités energétiques de systéme stockage chimique basée sur des réactions solide gaz renversables" describes a study of the variation of the energy density of the reaction as a function of the initial compaction of the salt, this reaction being carried out in the absence of any compound similar to expanded graphite. Such compaction is expressed in moles of anhydrous salt per $m^3$. The curve published on page 109 of this publication shows that, for each reaction studied, there exists a compaction value for which the energy density, expressed in kWh per $m^3$ is maximum. In the rest of the text, this value will be called optimum compaction of the reaction without graphite.

An object of the present invention is to provide a method which makes it possible to conduct a reaction of the above type in the presence of expanded graphite, the reagent formed by one or more salts being present in the reaction medium in powdery form, said reaction having optimum power.

For that, the invention provides a method of conducting an absorption or desorption reaction between a gas and a solid, said solid being formed by one or more salts in powdery form, in the presence of expanded graphite, in which method the reaction medium comprises between 0—not included—and 60% by weight of expanded graphite, characterized in that, in order to form the reaction medium, a powdery solid is used having a compaction between 5 and 60% of the optimum compaction of the reaction without graphite.

In preferred embodiments of the invention, the percentage of expanded graphite is between 20 and 25% included by weight and the packing of the salt is chosen in a range between 20 and 60% of the optimum compaction; for a graphite percentage between 25 excluded and 35% included, the compaction of the salt is chosen between 15 and 55% of the maximum value; for a graphite percentage between 35 excluded and 40% included, the compaction of the salt is chosen between 15 and 50% of the optimum value; for a graphite percentage between 40 excluded and 45% included, the compaction of the salt is chosen between 10 and 50% of the optimum value; for a graphite percentage between 45 excluded and 50% included, the compaction of the salt is chosen between 10 and 45% of the optimum value; and finally for a graphite percentage between 50 excluded and 60% included, the compaction of the salt is chosen between 5 and 40% of the optimum value.

In another embodiment of the invention, the solid powdery compound is formed by a salt or a mixture of salts, itself formed by a compound of a halogen chosen from Cs, Br, I, F and an element chosen from: Li, Na, K, Rb, Be, Mg, Ca, Sr, Ba, Mn, Fe, Co, Ni, Cu, Ag, Au, Zn, Cd, Hg, Sn, Pb, Cr, Sb.

But also, this salt or these mixtures of salts may be chosen from: $NH_4Cl$, $NH_4Br$, $NH_4I$, $NH_4NO_3$, $Sr(ClO_4)_2$, $Ba(ClO_4)_2$, $Fe_2(SO_4)_3$, $NiSO_4$, $CuSO_4$, $Ag(ClO_4)$, $AgNO_3$, $ZnSO_4$.

Figure 2:
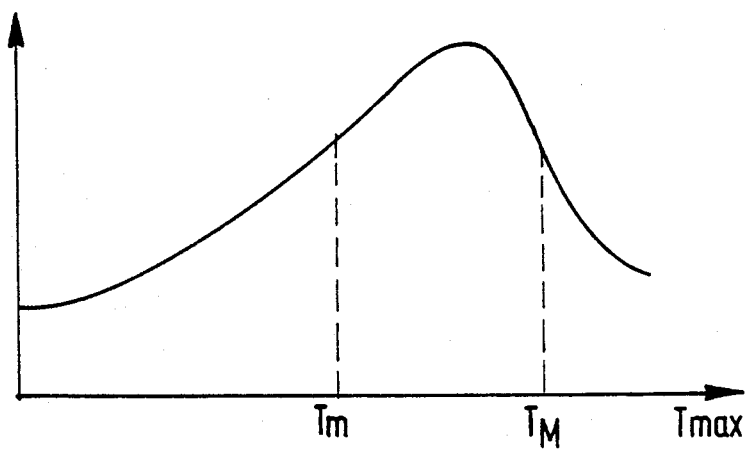

But other characteristics and advantages of the invention will appear more clearly from the following description, given by way of non limitative illustration with reference to the accompanying figures in which:

FIG. 1 shows the variation of the energy density as a function of the compaction of the salt for a reaction without expanded graphite, FIG. 2 shows the variation of the mean power as a function of the compaction of the salt and the expanded graphite mixture.

The variation of the energy density, which is shown in FIG. 1, is taken from the above mentioned publication and published in the review Physique Appliquée, and clearly shows that the energy density is maximum for a very specific value of the compaction of the salt, this compaction being designated Topt in this FIG. 1.

In FIG. 2, the variation of the mean power has been shown as a function of the compaction of the mixture, namely of the reaction medium comprising the salt or salts and expanded graphite.

It will be noted that the energy density passes through a maximum which is between two values Tm and TM, these values corresponding to a certain percentage of the Topt value shown in FIG. 1.

By way of illustration, the values will be given below of the measurements made for a reaction using calcium chloride and methylamine, which reaction was conducted in the presence of expanded graphite.

For a weighted rate of 25% of expanded graphite, the compaction optimum, for optimum power, is situated at about 244 kg of mixture per $m^3$, i.e. 183 kg of anhydrous salt (calcium chloride) per $m^3$, which corresponds to compaction of the salt equal to 45% of the Topt value defined as being the optimum compaction of the reaction without graphite. For a rate of 35% of expanded graphite, the compaction optimum is situated at 186 kg of mixture per $m^3$, which corresponds to compaction equal to 35% of the optimum compaction such as defined above. Using the experimental curves similar to FIG. 2, it can be readily determined that compaction optimum is situated between:—20 and 60% of the optimum compaction in the presence of 25% graphite and between 15 and 55% in the presence of 35% graphite.

Similarly, it can be verified that for a reaction using lithium chloride in the presence of methylamine, the optimum, for 40% expanded graphite, is situated at a value of 86 kg of salt per $m^3$, which corresponds for equilibrium between 2 and 3 moles of methylamine, to 40% of the optimum compaction.

In the following tables the compaction ranges have been shown for simultaneously optimizing the power and the energy density, these ranges being drawn up for different percentages of expanded graphite and for a whole series of equilibriums with ammonia and a whole series of equilibriums of different salts with methylamine.

In these tables, in the first column the nature of the salt has been shown, in the second column the equilibrium concerned between the salt and the gas molecules, in the third column the minimum and maximum weight values of anhydrous salt expressed in kg per m$^3$, corresponding to 25% of expanded graphite, whereas the last three columns contain indications of the compaction minimum and maximum for 35%, 50% and 60% of expanded graphite. The first series of tables concerns the reactions conducted in the presence of ammonia whereas the second series concerns reactions conducted in the presence of methylamine.

| Salts | Equilibrium | With NH$_3$ | | | |
|---|---|---|---|---|---|
| | | 25% | 35% | 50% | 60% |
| LiCl | 0–1 | 180/560 | 130/510 | 90/420 | 40/370 |
| | 1–2 | 120/360 | 90/330 | 60/270 | 30/240 |
| | 2–3 | 80/270 | 60/250 | 40/200 | 20/180 |
| | 3–4 | 70/210 | 50/200 | 30/160 | 10/140 |
| | 4–5 | 50/180 | 40/160 | 20/130 | 10/120 |
| LiBr | 0–1 | 340/1040 | 250/950 | 170/780 | 80/690 |
| | 1–2 | 230/690 | 170/640 | 110/520 | 50/460 |
| | 2–3 | 170/520 | 130/480 | 80/390 | 40/350 |
| | 3–4 | 140/420 | 100/380 | 70/310 | 30/280 |
| | 4–5 | 120/350 | 80/320 | 50/260 | 20/230 |
| LiI | 0–1 | 460/1390 | 340/1270 | 230/1040 | 110/930 |
| | 1–2 | 320/970 | 240/890 | 160/730 | 80/650 |
| | 2–3 | 240/740 | 180/680 | 120/560 | 60/500 |
| | 3–4 | 200/600 | 150/550 | 100/450 | 50/400 |
| | 4–5 | 160/510 | 120/460 | 80/380 | 40/340 |
| | 5–5,5 | 150/470 | 110/430 | 70/350 | 30/320 |
| NaCl | 0–2,5 | 130/390 | 90/360 | 60/300 | 30/260 |
| | 2,5–5 | 70/230 | 50/210 | 30/180 | 20/160 |
| NaBr | 0–5,25 | 120/380 | 90/350 | 60/280 | 30/250 |
| NaI | 0–4 | 210/640 | 150/580 | 100/480 | 50/430 |
| | 4–4,5 | 190/590 | 140/540 | 90/440 | 40/390 |
| | 4,5–6 | 150/470 | 110/430 | 70/350 | 30/310 |
| KI | 0–4 | 210/650 | 160/600 | 100/490 | 50/430 |
| | 4–6 | 160/490 | 120/450 | 80/370 | 40/330 |
| RbBr | 0–3 | 260/800 | 190/730 | 130/600 | 60/530 |
| RbI | 0–6 | 200/610 | 150/560 | 100/460 | 50/410 |
| NH$_4$Cl | 0–3 | 90/290 | 70/270 | 40/220 | 20/200 |
| NH$_4$Br | 0–1 | 290/900 | 220/830 | 140/680 | 70/600 |
| | 1–5 | 110/360 | 80/330 | 50/270 | 20/240 |
| or | 1–4 | 130/420 | 100/380 | 60/320 | 30/280 |
| | 4–6 | 100/310 | 70/290 | 50/230 | 20/210 |
| NH$_4$I | 0–1 | 350/1050 | 260/970 | 170/790 | 80/700 |
| | 1–2 | 260/810 | 200/740 | 130/610 | 60/540 |
| | 2–3 | 210/660 | 160/600 | 100/490 | 50/440 |
| | 3–5 | 150/480 | 110/440 | 70/360 | 30/320 |
| | 5–6 | 130/420 | 100/390 | 60/320 | 30/280 |
| NH$_4$NO$_3$ | 0–0,5 | 270/820 | 200/750 | 130/610 | 60/550 |
| BeCl$_2$ | 0–2 | 170/520 | 120/480 | 80/390 | 40/350 |
| | 2–4 | 110/340 | 80/310 | 50/260 | 20/230 |
| | 4–6 | 80/250 | 60/230 | 40/190 | 20/170 |
| | 6–12 | 40/140 | 30/130 | 20/110 | 10/100 |
| BeBr$_2$ | 0–4 | 220/680 | 160/620 | 110/510 | 50/460 |
| | 4–6 | 160/510 | 120/470 | 80/380 | 40/340 |
| | 6–10 | 110/340 | 80/310 | 50/260 | 20/230 |
| BeI$_2$ | 0–4 | 320/980 | 240/900 | 160/740 | 80/650 |
| | 4–6 | 240/750 | 180/690 | 120/560 | 60/500 |
| | 6–13 | 130/410 | 100/380 | 60/310 | 30/270 |
| MgCl$_2$ | 0–1 | 280/870 | 210/790 | 140/650 | 70/580 |
| | 1–2 | 210/630 | 150/580 | 100/470 | 50/420 |
| | 2–4 | 130/410 | 100/370 | 60/310 | 30/270 |
| | 4–6 | 90/300 | 70/280 | 40/230 | 20/200 |
| MgBr$_2$ | 0–1 | 490/1480 | 370/1360 | 240/1110 | 120/990 |
| | 1–2 | 370/1110 | 270/1020 | 180/830 | 90/740 |
| | 2–6 | 180/550 | 130/510 | 90/420 | 40/370 |
| MgI$_2$ | 0–1 | 630/1900 | 470/1740 | 310/1430 | 150/1270 |
| | 1–2 | 490/1480 | 370/1350 | 240/1110 | 120/990 |
| | 2–6 | 260/780 | 190/720 | 130/590 | 60/520 |
| CaCl$_2$ | 0–1 | 280/870 | 210/800 | 140/650 | 70/580 |
| | 1–2 | 210/660 | 160/600 | 100/490 | 50/440 |
| | 2–4 | 170/530 | 130/480 | 80/400 | 40/350 |
| | 4–8 | 100/330 | 80/300 | 50/240 | 20/220 |
| CaBr$_2$ | 0–1 | 470/1420 | 350/1300 | 230/1060 | 110/950 |
| | 1–2 | 360/1090 | 270/1000 | 180/820 | 90/730 |
| | 2–6 | 180/570 | 140/530 | 90/430 | 40/380 |
| | 6–8 | 150/460 | 110/420 | 70/350 | 30/310 |
| CaI$_2$ | 0–1 | 590/1780 | 440/1630 | 290/1330 | 140/1190 |
| | 1–2 | 470/1420 | 350/1300 | 230/1060 | 110/950 |
| | 2–3 | 390/1180 | 290/1080 | 190/890 | 90/790 |
| | 3–6 | 260/780 | 190/720 | 130/590 | 60/520 |
| SrCl$_2$ | 0–1 | 410/1240 | 300/1130 | 200/930 | 100/830 |
| | 1–8 | 140/430 | 100/400 | 70/320 | 30/290 |

-continued

| Salts | Equilibrium | With NH₃ | | | |
|---|---|---|---|---|---|
| | | 25% | 35% | 50% | 60% |
| or | 0-8 | | | | |
| SrBr₂ | 0-1 | 590/1770 | 440/1630 | 290/1330 | 140/1180 |
| | 1-2 | 450/1360 | 340/1250 | 220/1020 | 110/910 |
| | 2-6 | 240/710 | 170/650 | 110/530 | 50/480 |
| | 6-8 | 190/570 | 140/530 | 90/430 | 40/380 |
| SrI₂ | 0-1 | 680/2050 | 510/1880 | 340/1540 | 170/1370 |
| | 1-2 | 540/1640 | 400/1500 | 270/1230 | 130/1090 |
| | 2-6 | 300/910 | 220/830 | 150/680 | 70/610 |
| | 6-8 | 240/740 | 180/680 | 120/560 | 60/500 |
| Sr(ClO₄)₂ | 0-2 | 400/1220 | 300/1120 | 200/920 | 100/810 |
| | 2-6 | 230/710 | 170/650 | 110/540 | 50/480 |
| | 6-7 | 210/650 | 160/590 | 100/490 | 50/430 |
| BaCl₂ | 0-8 | 190/590 | 140/540 | 90/440 | 40/390 |
| BaBr₂ | 0-1 | 680/2040 | 510/1870 | 340/1530 | 170/1360 |
| | 1-2 | 520/1590 | 390/1450 | 260/1190 | 130/1060 |
| | 2-4 | 360/1100 | 270/1010 | 180/820 | 90/730 |
| | 4-8 | 220/680 | 160/620 | 110/510 | 50/450 |
| BaI₂ | 0-2 | 610/1860 | 460/1710 | 300/1400 | 150/1240 |
| | 2-4 | 440/1330 | 330/1220 | 220/1000 | 110/890 |
| | 4-6 | 340/1040 | 250/950 | 170/780 | 80/690 |
| | 6-8 | 280/850 | 210/780 | 140/640 | 70/570 |
| | 8-9 | 250/780 | 190/710 | 120/590 | 60/520 |
| Ba(ClO₄)₂ | 0-5 | 290/880 | 210/800 | 140/660 | 70/590 |
| | 5-6 | 260/790 | 190/730 | 130/590 | 60/530 |
| MnCl₂ | 0-0,5 | 450/1380 | 340/1270 | 220/1040 | 110/920 |
| | 0,5-1 | 370/1120 | 270/1030 | 180/840 | 90/750 |
| | 1-2 | 300/910 | 220/830 | 150/680 | 70/610 |
| | 2-6 | 150/460 | 110/420 | 70/350 | 30/310 |
| MnBr₂ | 0-1 | 650/1960 | 490/1800 | 320/1470 | 160/1310 |
| | 1-2 | 430/1300 | 320/1190 | 210/980 | 100/870 |
| | 2-6 | 240/730 | 180/670 | 120/550 | 60/490 |
| MnI₂ | 0-2 | 550/1650 | 410/1520 | 270/1240 | 130/1100 |
| | 2-6 | 310/940 | 230/870 | 150/710 | 70/630 |
| FeCl₂ | 0-1 | 380/1170 | 290/1070 | 190/880 | 90/780 |
| | 1-2 | 280/840 | 210/770 | 140/630 | 70/560 |
| | 2-6 | 150/480 | 110/440 | 70/360 | 40/320 |
| FeBr₂ | 0-1 | 600/1810 | 450/1660 | 300/1360 | 150/1210 |
| | 1-2 | 440/1340 | 330/1230 | 220/1000 | 110/890 |
| | 2-6 | 240/740 | 180/680 | 120/560 | 60/500 |
| FeI₂ | 0-2 | 570/1710 | 420/1570 | 280/1290 | 140/1140 |
| | 2-6 | 300/930 | 230/850 | 150/700 | 70/620 |
| Fe₂(SO₄)₃ | 0-3 | 390/1180 | 290/1080 | 190/880 | 90/790 |
| | 3-6 | 280/860 | 210/790 | 140/650 | 70/570 |
| | 6-12 | 180/560 | 140/510 | 90/420 | 40/370 |
| CoCl₂ | 0-1 | 400/1220 | 300/1120 | 200/920 | 100/820 |
| | 1-2 | 290/880 | 210/800 | 140/660 | 70/590 |
| | 2-6 | 160/500 | 120/460 | 80/380 | 40/340 |
| CoBr₂ | 0-1 | 620/1880 | 470/1730 | 310/1410 | 150/1260 |
| | 1-2 | 460/1390 | 340/1270 | 230/1040 | 110/920 |
| | 2-6 | 250/770 | 190/710 | 120/580 | 60/510 |
| CoI₂ | 0-2 | 590/1780 | 440/1630 | 290/1340 | 140/1190 |
| | 2-6 | 310/950 | 230/870 | 150/720 | 70/640 |
| NiCl₂ | 0-1 | 420/1260 | 310/1160 | 210/950 | 100/840 |
| | 1-2 | 290/900 | 220/820 | 140/670 | 70/600 |
| | 2-6 | 130/420 | 100/380 | 60/310 | 30/280 |
| | 6-7 | 120/370 | 90/340 | 60/280 | 30/250 |
| | 7-9 | 90/300 | 70/270 | 50/230 | 20/200 |
| | 9-10 | 90/270 | 60/250 | 40/210 | 20/180 |
| NiBr₂ | 0-1 | 640/1930 | 480/1770 | 320/1450 | 160/1290 |
| | 1-2 | 460/1410 | 350/1290 | 230/1060 | 110/940 |
| | 2-6 | 220/680 | 160/620 | 110/510 | 50/450 |
| NiI₂ | 0-2 | 600/1810 | 450/1660 | 300/1360 | 150/1210 |
| | 2-6 | 300/920 | 220/840 | 150/690 | 70/610 |
| NiSO₄ | 0-1 | 460/1380 | 340/1270 | 230/1040 | 110/920 |
| | 1-2 | 330/1010 | 250/920 | 160/760 | 80/670 |
| | 2-6 | 160/480 | 120/440 | 80/360 | 40/320 |
| CuCl | 0-0,5 | 540/1630 | 400/1490 | 270/1220 | 130/1090 |
| | 0,5-1 | 400/1210 | 300/1110 | 200/910 | 100/810 |
| | 1-1,5 | 320/970 | 240/890 | 160/730 | 80/650 |
| | 1,5-3 | 190/600 | 140/550 | 90/450 | 50/400 |
| CuBr | 0-1 | 530/1600 | 390/1460 | 260/1200 | 130/1070 |
| | 1-1,5 | 430/1300 | 320/1200 | 210/970 | 100/860 |
| | 1,5-3 | 270/830 | 200/760 | 130/620 | 60/550 |
| CuI | 0-0,5 | 820/2460 | 610/2260 | 400/1850 | 200/1640 |
| | 0,5-1 | 640/1940 | 480/1780 | 320/1450 | 160/1290 |
| | 1-1,5 | 530/1600 | 390/1460 | 260/1200 | 130/1070 |
| | 1,5-2 | 450/1360 | 330/1250 | 220/1020 | 110/910 |
| | 2-3 | 340/1050 | 260/960 | 170/790 | 80/700 |
| CuCl₂ | 0-2 | 290/900 | 220/820 | 140/680 | 70/600 |
| | 2-3¹/3 | 210/660 | 160/600 | 100/490 | 50/440 |

-continued

| Salts | Equilibrium | With NH₃ | | | |
|---|---|---|---|---|---|
| | | 25% | 35% | 50% | 60% |
| | 3 1/3–5 | 160/490 | 120/450 | 80/370 | 40/330 |
| CuBr₂ | 0–2 | 450/1380 | 340/1270 | 220/1040 | 110/920 |
| | 2–3 1/3 | 340/1030 | 250/940 | 170/770 | 80/690 |
| | 3 1/3–5 | 250/780 | 190/710 | 120/590 | 60/520 |
| CuSO₄ | 0–1 | 450/1380 | 340/1270 | 230/1040 | 110/920 |
| | 1–2 | 330/1010 | 250/930 | 160/760 | 80/680 |
| | 2–4 | 220/660 | 160/610 | 110/500 | 50/440 |
| | 4–5 | 180/570 | 140/520 | 90/430 | 40/380 |
| AgCl | 0–1 | 560/1690 | 420/1550 | 280/1270 | 140/1130 |
| | 1–1,5 | 450/1360 | 330/1240 | 220/1020 | 110/900 |
| | 1,5–3 | 280/850 | 210/780 | 140/640 | 70/570 |
| AgBr | 0–1 | 690/2080 | 510/1910 | 340/1560 | 170/1390 |
| | 1–1,5 | 560/1690 | 420/1550 | 280/1270 | 140/1130 |
| | 1,5–3 | 350/1080 | 260/990 | 170/810 | 90/720 |
| AgI | 0–0,5 | 900/2730 | 680/2500 | 450/2050 | 220/1820 |
| | 0,5–1 | 730/2190 | 540/2010 | 360/1650 | 180/1460 |
| | 1–1,5 | 610/1840 | 450/1680 | 300/1380 | 150/1220 |
| Ag(ClO₄) | 0–2 | 330/1000 | 250/920 | 160/750 | 80/670 |
| | 2–3 | 270/840 | 200/770 | 130/630 | 60/560 |
| AgNO₃ | 0–2 | 370/1140 | 280/1050 | 190/860 | 90/760 |
| AuCl | 0–1 | 820/2470 | 610/2260 | 410/1850 | 200/1640 |
| | 1–2 | 560/1710 | 420/1560 | 280/1280 | 140/1140 |
| | 2–6 | 250/770 | 190/700 | 120/580 | 60/510 |
| AuBr | 0–1 | 910/2760 | 680/2530 | 450/2070 | 230/1840 |
| | 1–2 | 640/1950 | 480/1780 | 320/1460 | 160/1300 |
| | 2–3 | 500/1500 | 370/1380 | 250/1130 | 120/1000 |
| | 3–4 | 400/1220 | 300/1120 | 200/920 | 100/820 |
| | 4–6 | 290/890 | 220/820 | 140/670 | 70/600 |
| AuI | 0–1 | 1000/3020 | 750/2770 | 500/2260 | 250/2010 |
| | 1–2 | 720/2170 | 540/1990 | 360/1630 | 180/1450 |
| | 2–3 | 560/1690 | 420/1550 | 280/1270 | 140/1130 |
| | 3–6 | 330/1020 | 250/940 | 170/770 | 80/680 |
| ZnCl₂ | 0–1 | 370/1140 | 280/1040 | 180/860 | 90/760 |
| | 1–2 | 280/840 | 210/770 | 140/630 | 70/560 |
| | 2–4 | 180/560 | 130/510 | 90/420 | 40/370 |
| | 4–6 | 170/520 | 120/470 | 80/390 | 40/350 |
| ZnBr₂ | 0–1 | 570/1720 | 420/1580 | 280/1290 | 140/1150 |
| | 1–2 | 430/1300 | 320/1190 | 210/980 | 100/870 |
| | 2–4 | 290/880 | 210/810 | 140/660 | 70/590 |
| | 4–5 | 270/810 | 200/750 | 130/610 | 60/540 |
| | 5–6 | 260/790 | 190/720 | 130/590 | 60/530 |
| ZnI₂ | 0–1 | 680/2070 | 510/1900 | 340/1550 | 170/1380 |
| | 1–2 | 540/1630 | 400/1490 | 270/1220 | 130/1090 |
| | 2–4 | 370/1140 | 280/1050 | 190/860 | 90/760 |
| | 4–6 | 320/970 | 240/890 | 160/730 | 80/650 |
| ZnSO₄ | 0–0,5 | 550/1670 | 410/1530 | 270/1250 | 130/1110 |
| | 0,5–1 | 450/1370 | 340/1260 | 230/1030 | 110/920 |
| | 1–2 | 330/1010 | 250/930 | 160/760 | 80/680 |
| | 2–3 | 260/800 | 200/740 | 130/600 | 60/540 |
| | 3–4 | 220/670 | 160/610 | 110/500 | 50/440 |
| | 4–5 | 180/570 | 140/520 | 90/430 | 40/380 |
| CdCl₂ | 0–1 | 580/1740 | 430/1600 | 290/1310 | 140/1160 |
| | 1–2 | 450/1360 | 330/1250 | 220/1020 | 110/910 |
| | 2–4 | 280/870 | 210/800 | 140/660 | 70/580 |
| | 4–6 | 210/650 | 160/600 | 100/490 | 50/440 |
| CdBr₂ | 0–1 | 750/2270 | 560/2080 | 370/1700 | 180/1510 |
| | 1–2 | 590/1790 | 440/1640 | 290/1340 | 140/1200 |
| | 2–6 | 300/910 | 220/830 | 150/680 | 70/610 |
| CdI₂ | 0–2 | 660/2000 | 500/1840 | 330/1500 | 160/1340 |
| | 2–6 | 360/1090 | 270/1000 | 180/820 | 90/730 |
| HgCl₂ | 0–1,5 | 840/2530 | 630/2320 | 420/1900 | 210/1690 |
| | 1,5–2 | 610/1860 | 460/1710 | 300/1400 | 150/1240 |
| | 2–8 | 210/650 | 160/600 | 100/490 | 50/440 |
| HgBr₂ | 0–2 | 790/2380 | 590/2180 | 390/1790 | 190/1590 |
| | 2–8 | 270/830 | 200/760 | 130/630 | 60/560 |
| HgI₂ | 0–4/3 | 860/2600 | 640/2380 | 430/1950 | 210/1730 |
| | 4/3–2 | 830/2490 | 620/2280 | 410/1870 | 200/1660 |
| | 2–6 | 400/1230 | 300/1130 | 200/920 | 100/820 |
| HgF₂ | 0–2 | 730/2220 | 550/2030 | 360/1670 | 180/1480 |
| SnCl₂ | 0–4 | 250/770 | 190/700 | 120/580 | 60/510 |
| | 4–9 | 130/420 | 100/380 | 60/310 | 30/280 |
| SnBr₂ | 0–1 | 690/2100 | 520/1930 | 350/1580 | 170/1400 |
| | 1–2 | 530/1600 | 390/1460 | 260/1200 | 130/1070 |
| | 2–3 | 420/1290 | 320/1180 | 210/970 | 100/860 |
| | 3–5 | 300/930 | 230/850 | 150/700 | 70/620 |
| | 5–9 | 190/600 | 140/550 | 90/450 | 40/400 |
| SnI₂ | 0–1 | 770/2340 | 580/2140 | 380/1760 | 190/1560 |
| | 1–2 | 610/1850 | 460/1700 | 300/1390 | 150/1240 |
| | 2–3 | 500/1530 | 380/1410 | 250/1150 | 120/1020 |
| | 3–5 | 370/1140 | 280/1050 | 180/860 | 90/760 |

-continued

| Salts | Equilibrium | With NH₃ 25% | 35% | 50% | 60% |
|---|---|---|---|---|---|
| | 5–9 | 250/760 | 180/690 | 120/570 | 60/500 |
| | 9–10 | 230/700 | 170/640 | 110/520 | 50/470 |
| PbCl₂ | 0–1 | 760/2300 | 570/2110 | 380/1720 | 190/1530 |
| | 1–1,5 | 650/1960 | 480/1790 | 320/1470 | 160/1310 |
| | 1,5–2 | 560/1710 | 420/1560 | 280/1280 | 140/1140 |
| | 2–3,25 | 420/1290 | 320/1180 | 210/970 | 100/860 |
| | 3,25–8 | 220/670 | 160/620 | 110/510 | 50/450 |
| PbBr₂ | 0–1 | 910/2740 | 680/2520 | 450/2060 | 220/1830 |
| | 1–2 | 690/2090 | 520/1920 | 340/1570 | 170/1390 |
| | 2–3 | 560/1690 | 420/1550 | 280/1270 | 140/1130 |
| | 3–5,5 | 370/1140 | 280/1040 | 180/860 | 90/760 |
| | 5,5–8 | 280/860 | 210/790 | 140/650 | 70/580 |
| PbI₂ | 0–0,5 | 1050/3170 | 790/2900 | 520/2380 | 260/2110 |
| | 0,5–1 | 920/2770 | 690/2540 | 460/2080 | 230/1850 |
| | 1–2 | 730/2210 | 550/2030 | 360/1660 | 180/1480 |
| | 2–5 | 450/1380 | 340/1270 | 220/1040 | 110/920 |
| | 5–8 | 330/1000 | 250/920 | 160/750 | 80/670 |
| CrCl₂ | 0–6 | 150/460 | 110/420 | 70/350 | 30/310 |
| CrBr₂ | 0–6 | 230/700 | 170/640 | 110/530 | 50/470 |
| CrI₂ | 0–6 | 270/840 | 200/770 | 130/630 | 60/560 |
| SbF₃ | 0–1 | 600/1810 | 450/1660 | 300/1360 | 150/1210 |
| | 1–2 | 450/1360 | 330/1250 | 220/1020 | 110/910 |
| | 2–3 | 360/1090 | 270/1000 | 180/820 | 90/730 |
| | 3–4 | 250/760 | 180/700 | 120/570 | 60/510 |
| | 4–6 | 180/560 | 130/520 | 90/420 | 40/380 |

| Salts | Equilibrium | With CH₃NH₂ 25% | 35% | 50% | 60% |
|---|---|---|---|---|---|
| LiCl | 0–1 | 120/380 | 90/350 | 60/290 | 30/260 |
| | 1–2 | 80/250 | 60/230 | 40/190 | 20/170 |
| | 2–3 | 30/120 | 20/110 | 10/90 | 10/80 |
| | 3–4 | 30/110 | 20/100 | 10/90 | 10/80 |
| MgCl₂ | 0–2 | 140/430 | 100/390 | 70/320 | 30/290 |
| | 2–4 | 80/250 | 60/230 | 40/190 | 20/170 |
| | 4–8 | 40/140 | 30/130 | 20/110 | 10/100 |
| CaCl₂ | 0–1 | 220/680 | 160/620 | 110/510 | 50/460 |
| | 1–2 | 150/460 | 110/430 | 70/350 | 30/310 |
| | 2–4 | 90/280 | 70/260 | 40/210 | 20/190 |
| | 4–6 | 80/250 | 60/230 | 40/190 | 20/170 |
| SrCl₂ | 0–5/3 | 240/740 | 180/680 | 120/550 | 60/490 |
| | 5/3–3 | 160/500 | 120/460 | 80/380 | 40/330 |
| MnCl₂ | 0–1 | 280/850 | 210/780 | 140/640 | 70/570 |
| | 1–2 | 180/560 | 130/510 | 90/420 | 40/380 |
| | 2–6 | 100/310 | 70/290 | 50/230 | 20/210 |
| FeCl₂ | 0–5 | 90/280 | 60/260 | 40/210 | 20/190 |
| CoCl₂ | 0–4 | 110/350 | 80/320 | 50/260 | 20/230 |
| | 4–6 | 80/250 | 60/230 | 40/190 | 20/170 |
| NiCl₂ | 0–4 | 110/350 | 80/320 | 50/270 | 20/240 |
| | 4–6 | 80/250 | 60/230 | 40/190 | 20/170 |
| CuCl₂ | 0–4 | 110/360 | 80/330 | 50/270 | 30/240 |
| ZnCl₂ | 0–2 | 190/590 | 140/540 | 90/440 | 40/390 |
| | 2–4 | 150/460 | 110/420 | 70/350 | 30/310 |
| | 4–6 | 120/380 | 90/350 | 60/290 | 30/260 |
| LiBr | 0–1 | 240/730 | 180/670 | 120/550 | 60/490 |
| | 1–2 | 140/440 | 110/410 | 70/330 | 30/300 |
| | 2–3 | 100/320 | 70/290 | 50/240 | 20/210 |
| | 3–4 | 80/250 | 60/230 | 40/190 | 20/170 |
| | 4–5 | 60/210 | 50/190 | 30/160 | 10/140 |
| MnBr₂ | 0–4 | 180/550 | 130/510 | 90/410 | 40/370 |
| | 4–6 | 130/400 | 90/360 | 60/300 | 30/270 |
| FeBr₂ | 0–5 | 150/470 | 110/430 | 70/350 | 30/310 |
| COBr₂ | 0–6 | 130/410 | 100/370 | 60/310 | 30/270 |
| NiBr₂ | 0–6 | 130/410 | 100/380 | 60/310 | 30/270 |
| CuBr₂ | 0–4 | 190/590 | 140/540 | 90/440 | 40/390 |
| ZnBr₂ | 0–5 | 150/470 | 110/440 | 70/360 | 30/320 |
| CdBr₂ | 0–3 | 280/850 | 210/780 | 140/640 | 70/570 |
| LiI | 0–0,25 | 600/1810 | 450/1660 | 300/1360 | 150/1210 |
| | 0,25–0,5 | 470/1430 | 350/1310 | 230/1080 | 110/960 |
| | 0,5–1 | 330/1010 | 250/930 | 160/760 | 80/680 |
| | 1–2 | 210/640 | 150/590 | 100/480 | 50/430 |
| | 2–3 | 150/470 | 110/430 | 70/350 | 30/310 |
| | 3–3,5 | 130/410 | 100/380 | 60/310 | 30/280 |
| MnI₂ | 0–6 | 180/550 | 130/500 | 90/410 | 40/370 |
| FeI₂ | 0–5 | 210/640 | 150/590 | 100/480 | 50/430 |
| CoI₂ | 0–4 | 250/780 | 190/720 | 120/590 | 60/520 |
| | 4–6 | 180/560 | 140/520 | 90/420 | 40/380 |
| NiI₂ | 0–6 | 180/570 | 140/520 | 90/430 | 40/380 |
| ZnI₂ | 0–5 | 210/640 | 150/590 | 100/480 | 50/430 |
| CdI₂ | 0–3 | 350/1080 | 260/990 | 170/810 | 80/720 |
| NiSO₄ | 0–3 | 170/510 | 120/470 | 80/390 | 40/340 |
| | 3–4,5 | 120/370 | 90/340 | 60/280 | 30/250 |
| | 4,5–5,5 | 100/310 | 70/290 | 50/240 | 20/210 |
| | 5,5–8 | 70/230 | 50/210 | 30/170 | 10/150 |
| Fe₂(SO₄)₃ | 0–7 | 170/530 | 130/490 | 80/400 | 40/350 |
| | 7–12 | 110/350 | 80/320 | 50/270 | 20/240 |
| ZnSO₄ | 0–3 | 170/530 | 130/480 | 80/400 | 40/350 |
| | 3–3,12 | 160/510 | 120/470 | 80/380 | 40/340 |
| | 3,12–3,5 | 150/470 | 110/430 | 70/350 | 30/310 |
| | 3,5–4,25 | 130/400 | 100/370 | 60/300 | 30/270 |

Obviously, additional modifications and variations of the present invention are possible in light of the above teachings. It is therefore to be understood that within the scope of the appended claims, the invention may be practiced otherwise than as specifically described herein.

We claim:

1. A method of conducting an absorption or desorption reaction between a gas and a solid, said solid being formed by one or more salts in powdery form, in the presence of expanded graphite, in which method the reaction medium comprises expanded graphite in a positive amount up to 60% by weight, characterized in that, in order to form the reaction medium, a powdery solid is used having a compaction between 5 and 60% of the optimum compaction of the reaction without graphite, wherein said optimum compaction is the compaction value for which the energy density is a maximum for the reaction without graphite.

2. Method according to claim 1, in which the percentage of expanded graphite is between 20 and 25% included by weight, characterized in that the compaction of the salt is chosen in a range between 20 and 60% of the optimum compaction.

3. Method according to claim 1, in which the percentage of expanded graphite is between 25 excluded and 35% included by weight, characterized in that compaction of the salt is chosen between 15 and 55% of the optimum compaction.

4. Method according to claim 1, in which the percentage of expanded graphite is between 35 excluded and 40% included, characterized in that compaction of the salt is chosen between 15 and 50% of the optimum compaction.

5. Method according to claim 1, in which the percentage of expanded graphite is between 40 excluded and 45% included by weight, characterized in that compaction of the salt is chosen between 10 and 50% of the optimum compaction.

6. Method according to claim 1, in which the percentage of expanded graphite is between 45 excluded and 50% included by weight, characterized in that compaction of the salt is chosen between 10 and 45% of the optimum compaction.

7. Method according to claim 1, in which the expanded graphite percentage is between 50 excluded and 60% by weight, characterized in that compaction of the salt is chosen in a range between 5 and 40% of the optimum compaction.

* * * * *